Aug. 31, 1965
E. S. BRUMFIELD ETAL
INFRARED SPECTROMETER FOR TARGET
DETECTION AND TRACKING
3,204,101
Filed Sept. 4, 1962
7 Sheets-Sheet 1
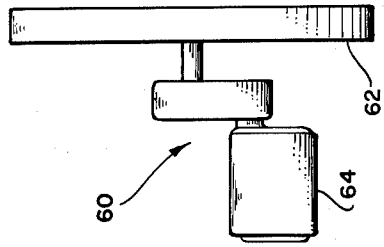
FIG. 15
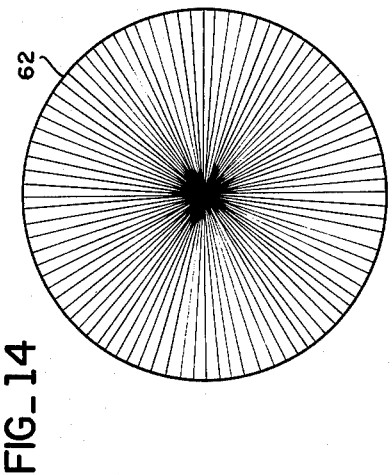
FIG. 14
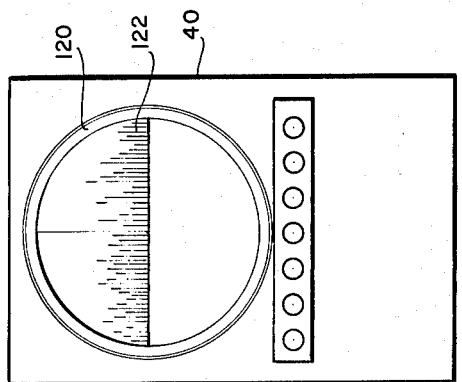
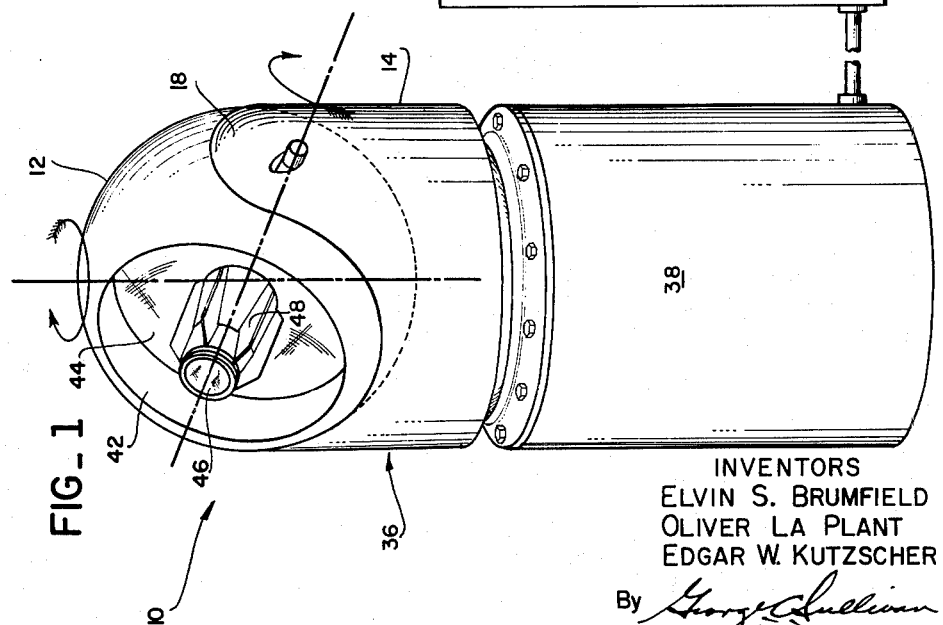
FIG. 1
INVENTORS
ELVIN S. BRUMFIELD
OLIVER LA PLANT
EDGAR W. KUTZSCHER
By *George Sullivan*
Agent

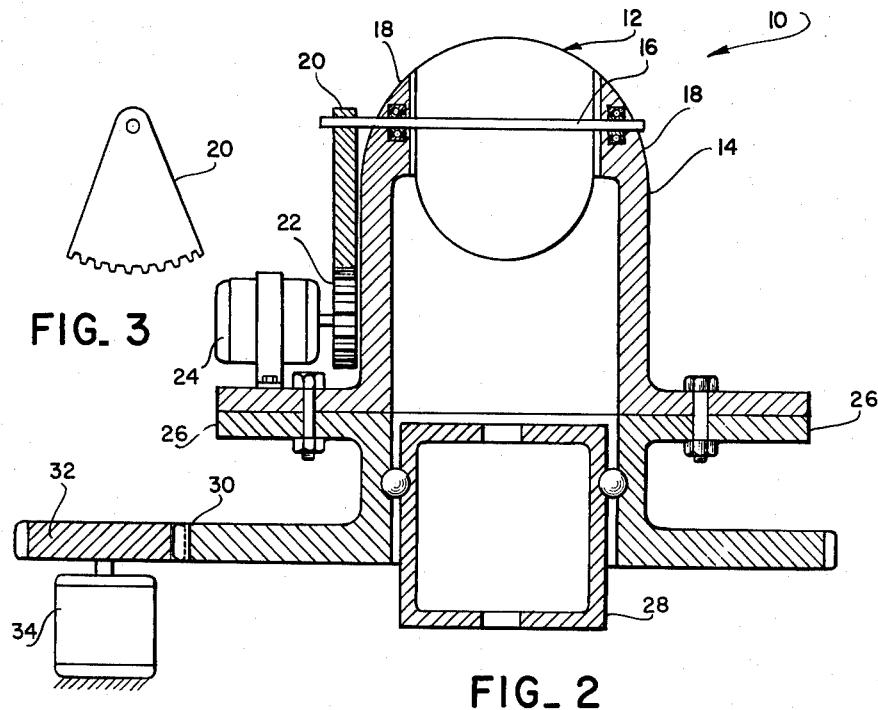
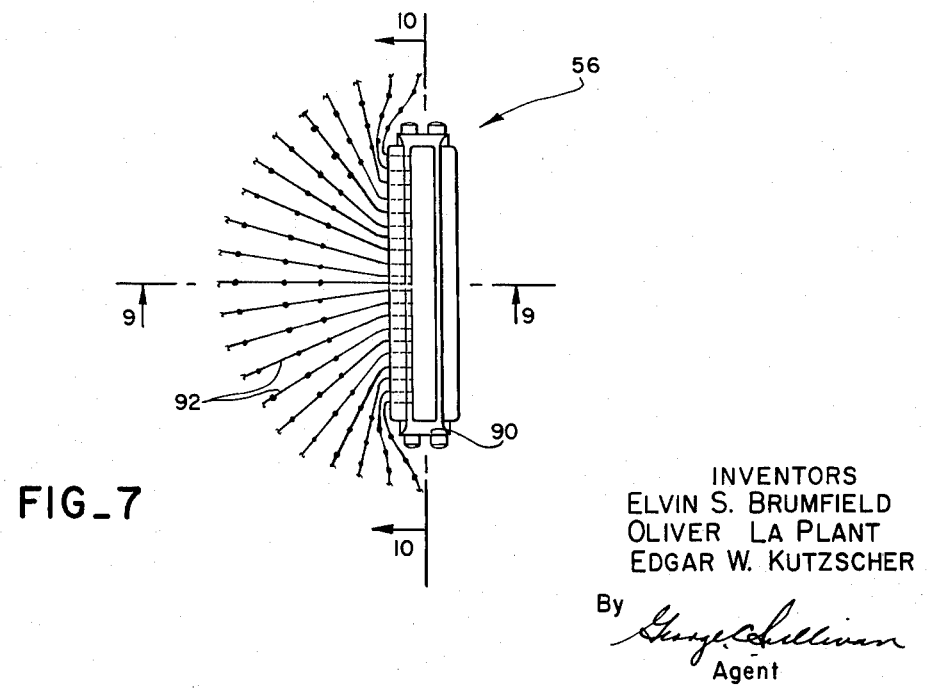

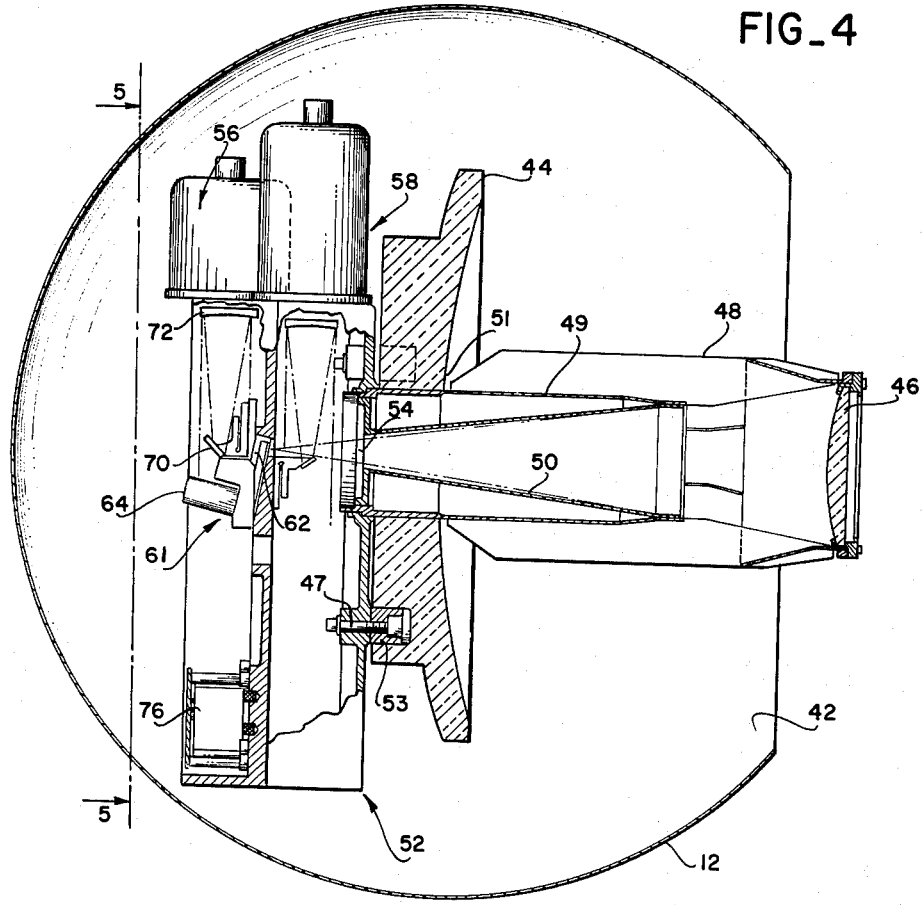
FIG_4
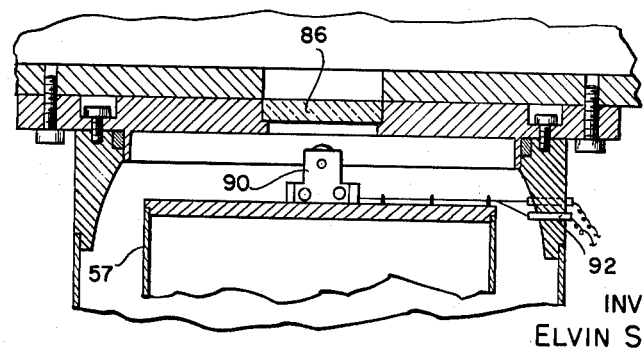
FIG_9
INVENTORS
ELVIN S. BRUMFIELD
OLIVER LA PLANT
EDGAR W. KUTZSCHER
By *George C. Sullivan*
Agent

INVENTORS
ELVIN S. BRUMFIELD
OLIVER LA PLANT
EDGAR W. KUTZSCHER

By George C. Sullivan
Agent

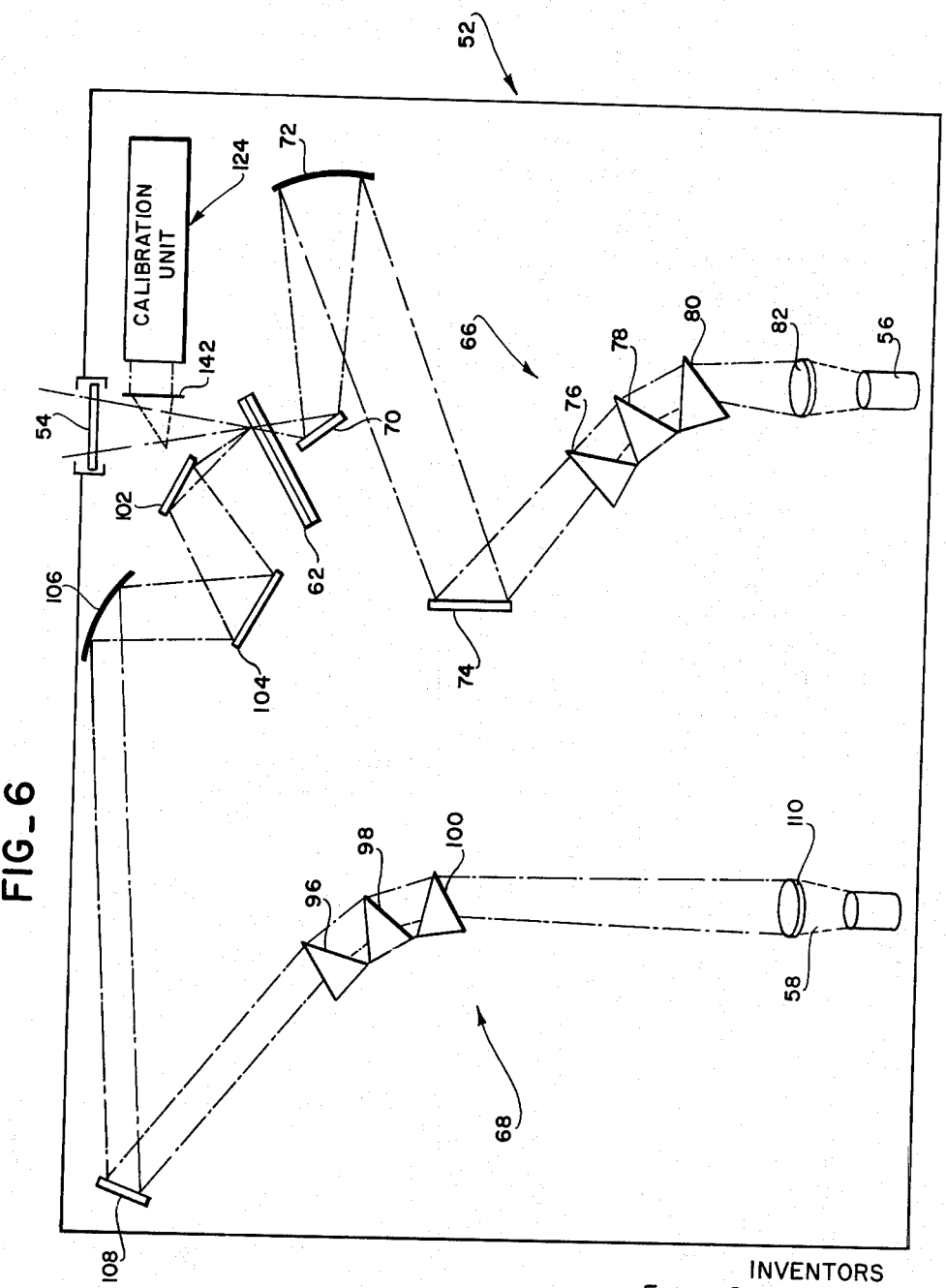

Aug. 31, 1965
E. S. BRUMFIELD ETAL
INFRARED SPECTROMETER FOR TARGET
DETECTION AND TRACKING
3,204,101
Filed Sept. 4, 1962
7 Sheets-Sheet 6
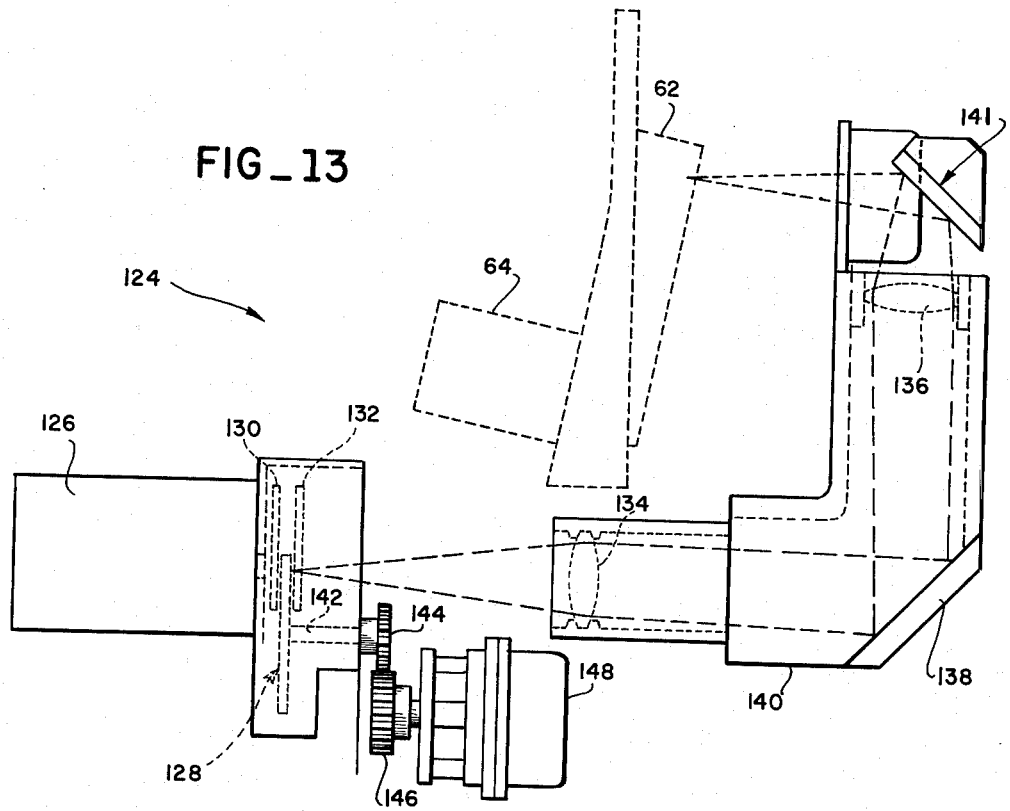
FIG_13
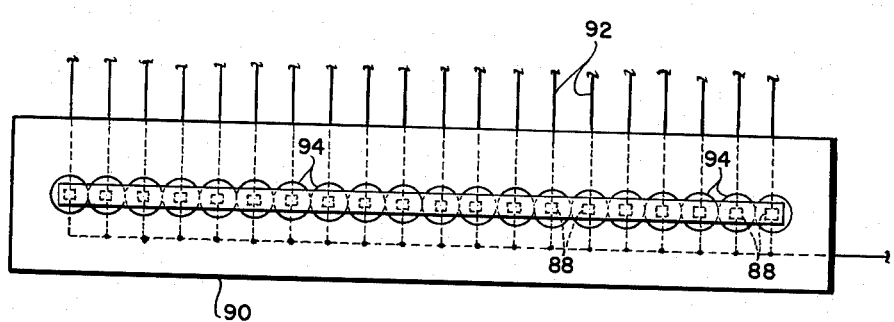
FIG_8
INVENTORS
ELVIN S. BRUMFIELD
OLIVER LA PLANT
EDGAR W. KUTZSCHER
By
Agent

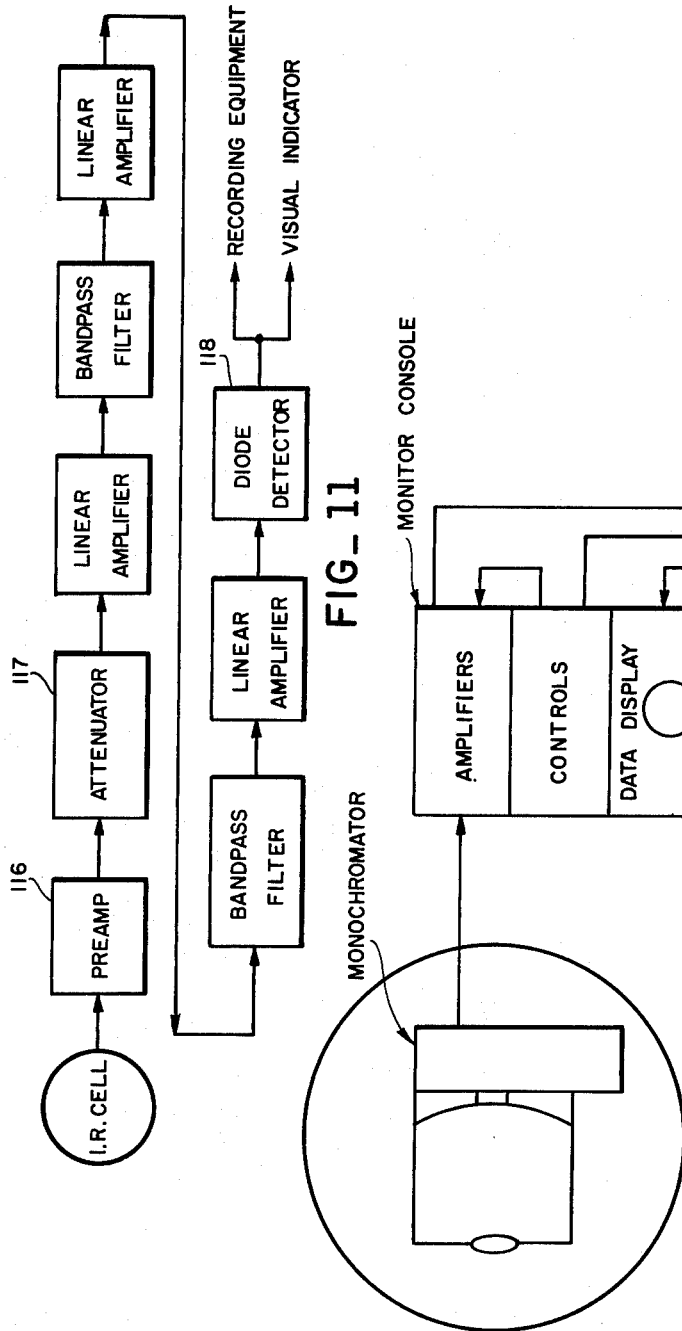
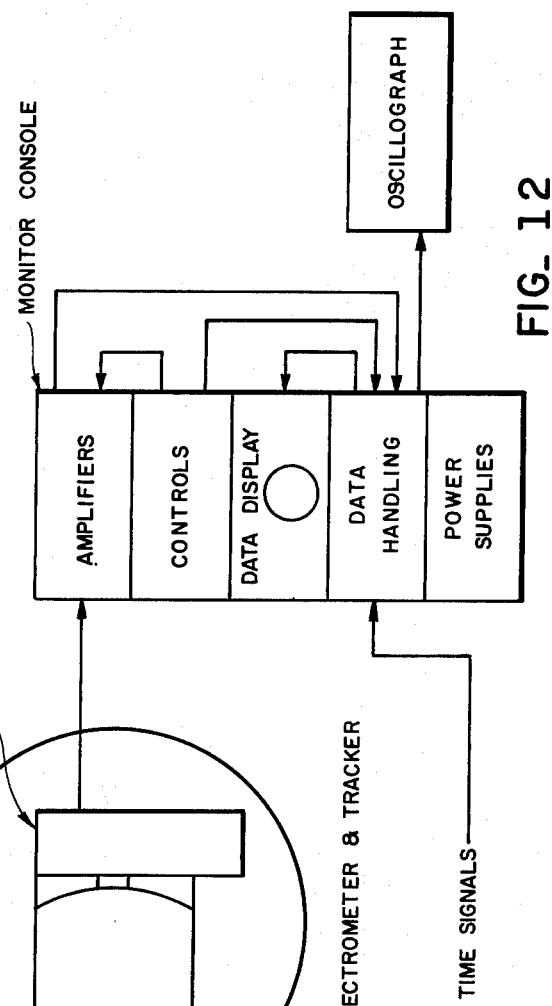

United States Patent Office 3,204,101
Patented Aug. 31, 1965

3,204,101
INFRARED SPECTROMETER FOR TARGET DETECTION AND TRACKING
Elvin S. Brumfield, Temple City, Oliver La Plant, Northridge, and Edgar W. Kutzscher, Sherman Oaks, Calif., assignors to Lockheed Aircraft Corporation, Burbank, Calif.
Filed Sept. 4, 1962, Ser. No. 221,010
17 Claims. (Cl. 250—83.3)

This invention relates to spectroscopy and more particularly to infrared spectrometer apparatus for simultaneously measuring energy in a plurality of spectral increments over an infrared spectrum.

The present invention is particularly useful in connection with tactical infrared equipment intended for target detection and tracking in which instance the spectra of infrared emissive targets of interest may be measured. From a military viewpoint, there are a great number of situations where knowledge of the spectral energy distribution of infrared targets, decoys, and background is of great value. Such measurements are essential for target classification, and for countermeasure and decoy development. An extensive knowledge concerning the spectral emittance characteristics of military targets and the radiation environment in which they are located is essential for the efficient design of tactical infrared devices. If these measurements are made under actual use conditions, the value of such information is considerably enhanced. By means of the spectrometer apparatus of the present invention, it is possible to obtain such spectral radiation distribution. Furthermore, it is possible to correlate certain spectral radiation distributions with certain classes of military targets. Further, the measurement of the spectral characteristics of exhaust gases of military devices, in the actual operating environment, will provide useful data concerning fuels. Spectral measurements of visually homogeneous areas under field conditions may give indication of camouflaged areas, especially if the spectral region covered is wide. All of these measurements fall within the capability of the spectrometer of the present invention.

There are two basic approaches to spectrometer systems; a scanning-prism, single-detector type, and a non-scanning multiple-detector type. The wavelength-scanning spectrometer has certain inherent limitations which restrict its usefulness in measurements of missile spectra. For example, the obtainable resolution is a function of the rate at which the spectrum is scanned over the detector and the bandpass of the system. If sharp absorption bands are to be measured, the signals which these produce, as the spectrum is scanned, must be limited in high-frequency components or they will be integrated and not recorded. Hence, this type of device is generally restricted to a slow scanning. Attempts to widen the bandpass, so that signals with more rapid fluctuations can be recorded, increase the amount of detector cell and input-circuit noise and limit the range obtainable. Another disadvantage of the single-cell scanning spectrometer is that a continuous spectral curve is obtained. The area under this curve must then be divided into sections before an analysis of specified spectral intervals can be obtained.

In a non-scanning, multiple-detector spectrometer, each cell is simultaneously irradiated by a given spectral increment, and resolution becomes a function of the number of detectors only. Thus, if a high rate of signal fluctuation is not encountered, the electronic bandpass can be quite narrow and excellent noise discrimination can be obtained.

As a further advantage of the multiple-detector spectrometer, detector cells may be selected for optimum signal-to-noise ratio for each spectral band, and simultaneous spectral information may be obtained. The rate of obtaining this information is limited only by the maximum useable chopping frequency.

It is therefore a principal object of the invention to provide a non-scanning, multiple-detector infrared spectrometer instrument having sensitivity over a wide wavelength region to detect and measure the small energy densities produced by weak targets.

Another object of the invention is to provide a spectrometer instrument capable of recording the spectra of small targets surrounded by a high energy background, as well as recording the spectra from sources covering the entire field of view of the instrument.

A further object of the invention is to provide novel and improved spectrometer apparatus capable of recording simultaneously over the entire spectral range of interest when the energy received at the instrument varies with time.

Yet another object of the invention is to provide novel and improved spectrometer apparatus which may be used under field conditions in order to function with large temperature variations, under wind load, and to withstand reasonable shock and vibrations.

Still another object of the invention is to provide novel and improved spectrometer apparatus incorporating simple calibration systems capable of recording data in a neat, complete, accurate fashion under adverse testing conditions.

A general object of this invention is to provide new and improved infrared spectrometer apparatus which overcomes disadvantages of previous means and methods heretofore intended to accomplish generally similar purposes.

Many other advantages, features and additional objects of the present invention will become manifest to those versed in the art upon making reference to the detailed description and the accompanying sheets of drawings in which a preferred structural embodiment, incorporating the principles of the present invention is shown by way of illustrative example.

In the drawings:

FIGURE 1 is a perspective view of the spectrometer system mounted on a support.

FIGURE 2 is a sectional view of the spectrometer support and drive mechanism.

FIGURE 3 is an elevational view of a segmental spur gear in the drive mechanism.

FIGURE 4 is a plan view partly in section of the spectrometer optical system.

FIGURE 6 is a schematic diagram of the internal optics of the monochromator.

FIGURE 7 is a plan view of the detector cell array and Dewar with the window assembly removed for clarity.

FIGURE 8 is an enlarged plan view of the cell array.

FIGURE 9 is a partial sectional taken along the line 9—9 of FIGURE 7.

FIGURE 11 is a block diagram illustrating the electronic signal handling portion of the spectrometer system.

FIGURE 12 is a block diagram of the infrared spectrometer system, illustrating the interconnections between the sub-systems.

FIGURE 13 is a schematic diagram illustrating the spectrometer calibration system.

FIGURE 14 is a plan view of the combined beam splitter and space filter.

FIGURE 15 is an elevational view of the combined beam splitter and space filter and a driving motor.

Figure 5:
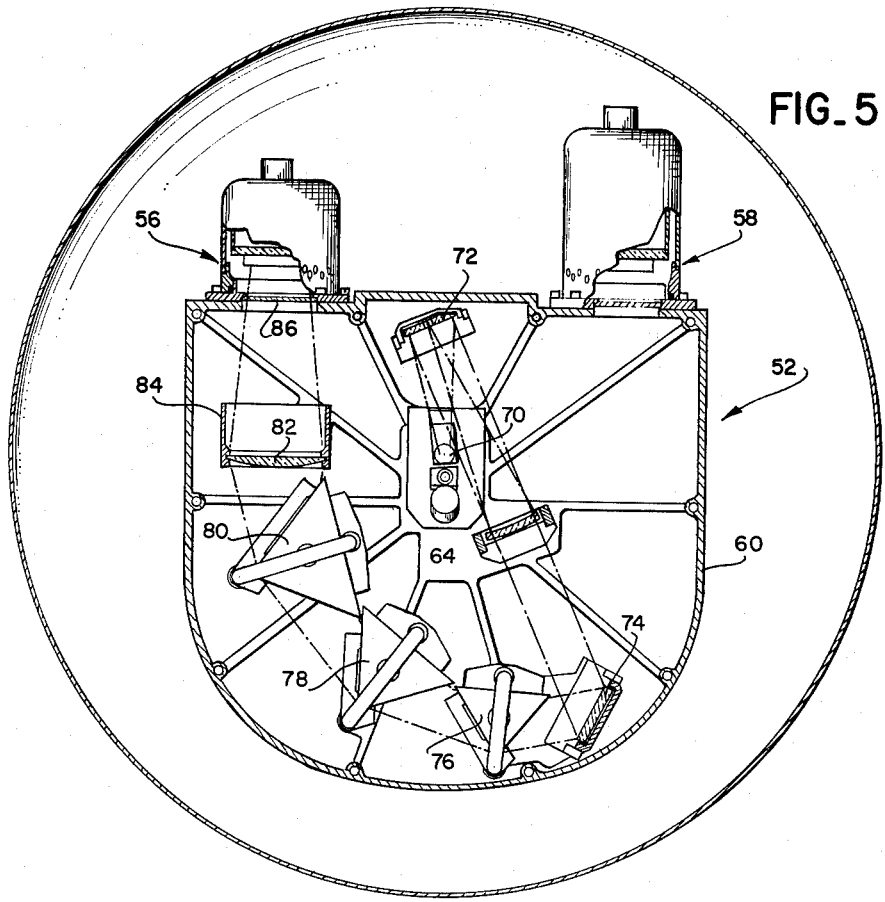
FIGURE 5 is a view taken along line 5—5 of FIGURE 4.

The invention resides partly in the physical and electrical structures and the interrelationships embodied in the electronic, mechanical and optical components of the system as herein specifically illustrated, but also embraces the concept of the spectrometer system itself, considered as an integrated whole, and independently of the structural details of its several parts. As stated hereinabove, spectrometer systems of the prior art usually comprise a collecting optical system, an entrance and exit slit, a scanning prism assembly, a detector, and associated electronic equipment. The basic disadvantages of such a system are, (1) a single detector cannot be chosen which is optimum over the entire wavelength region and, (2) the scan must be extremely rapid if the radiating object is changing its radiating characteristics.

With regard to (1) above, bolometers and thermocouples, which will cover the entire infrared region, are low in sensitivity and have undesirably long time constants. Photoconductive detectors are available with high sensitivity in certain wavelength regions, but no single detector of this type will cover a spectral region adequate for this application.

With regard to (2) above, in order to obtain adequate resolution with a rapid scan system, an amplifier of relatively wide bandwidth must be used, resulting in decreased system sensitivity.

In order to overcome the shortcomings of devices of the prior art, the spectrometer of the present invention employs a system of radiometric and/or photoelectric detectors, all using a common aperture, each of which covers a small increment of the total spectrum. This novel apparatus has a number of advantages for the intended application.

Each detector radiometer assembly is matched to the narrow wavelength interval it specifically covers so that the optimum effective sensitivity is obtained. Furthermore, readings in all parts of the spectrum are made simultaneously. Integration of the total energy under the spectrum curve for any particular region is readily carried out by numerical analysis provided that the sensitivity of each radiometric detector is reasonably uniform over its small wavelength interval. The spectral resolution of such a device, as employed in the present invention, is adequate and the received energy per channel satisfactorily high for field operations. Accordingly, there is employed in the present spectrometer invention a multiple detector radiometer of the type shown and disclosed in co-pending application, Serial No. 172,587, filed February 12, 1962 entitled Coolable Multi-Element Infrared Detector Assembly assigned to the same assignee as the present application.

In order to observe and analyze the spectra of a remote target, the spectrometer apparatus is mounted for movement about the azimuth and elevation axes. To perform its task successfully if the target is a moving one, a practical spectrometer system must acquire the target and then track it within very close limits. Acquisition, tracking, and stabilization may be performed by any suitable and well-known type of acquisition and tracking system. Suitable systems for performing these functions are shown and described in co-pending application Serial No. 142,114, filed October 2, 1961, entitled Infrared Tracker assigned to the same assignee as the present invention. Although a combined tracking-spectrometer system is not shown in detail, it will be readily apparent to those skilled in the art that the target acquisition and tracking mechanisms may be coupled with the spectrometer azimuth and elevation drive mechanisms described hereinafter, whereby the spectrometer may be caused to track a specified target. Since suitable target acquisition and tracking mechanisms are well known in the art, it is deemed unnecessary to show details of such a mechanism; the description of the invention which follows is considered sufficient to enable those skilled in the art to practice it.

Also, it will be obvious to those versed in the art that many design parameters of the invention may be varied in accordance with specification application requirements. For example, in the preferred embodiment described hereinafter, the infrared spectrum covering the range of wavelengths from 2 to 15 microns, is analyzed and the energy measured in 40 spectral increments. Other ranges and spectral increments may be utilized if desired. In the preferred embodiment, the spectrometer has an instantaneous field of view of 2 milliradians and a system sensitivity of approximately $10^{-12}$ watts/cm.$^2$/micron in each of the forty wavelength increments. By utilizing impurity-activated semiconductors in the detector radiometer assembly, the apparatus of the present invention will yield spectral information out to 15 microns with this high sensitivity. Heretofore, the 7 to 15 microns wavelength region has been almost completely inaccessible.

Referring now to FIGURE 1 of the drawings, the spectrometer system indicated generally by the reference numeral 10 comprises a generally spherical optical housing 12 and a generally cylindrical support housing 14. As best seen in FIGURE 2, the support housing 14 is provided with ears or trunnions 18 extending thereabove and diametrically opposed to each other. A shaft 16, rigidly secured to housing 12 is pivotally mounted on the trunnions 18 so that housing 12 can pivot in a vertical or elevational plane. A segmental spur gear 20, see FIGURE 3 is rigidly secured to shaft 18 and meshes with a drive gear 22 powered by elevation motor 24.

The support housing 14 is rigidly secured to a ring gear 26. Ring gear 26 is rotatably journalled on a fixed pedestal support 28 which is adapted to be mounted on a support surface and which serves as the azimuth axis for the optical housing 12. The teeth 30 of ring gear 26 mesh with the drive gear 32 of the azimuth drive motor 34. With this arrangement, operation of motors 24 and 34 cause the optical housing 12 to rotate on its elevational axis in shaft 16 and on its azimuth axis in the pedestal support 28.

As seen in FIGURE 1, the optical housing 12, the support housing 14, and the drive mechanisms are covered by a cylindrical shield 36 and are carried by a cylindrical housing 38 which may enclose related electronic equipment. A display 40 to be described below is connected to housing 38.

The optical housing 12 is provided with an aperture 42 in which lens elements and monochromator are mounted. These lens elements comprise a primary mirror 44 and a secondary mirror 46 held in spaced parallel facing relationship by a spider 48 to form a compact Cassegrainian optical system.

As seen in FIGURE 4 the secondary mirror 46 may be adjusted linearly and in angle by means of a plurality of push-pull screws 47 to achieve best focus. The primary mirror 44 is centered by means of tube 49 carried by a spider 48 and inserted in the hole 51 in the center of the mirror 44. The mirror is maintained in a plane by plugs 53 cemented into the rear surface of the mirror 44. These plugs are fabricated from a material such as Kovar which has a coefficient of thermal expansion closely resembling that of the material from which the mirror is fabricated. These plugs are adjusted before cementing so that when seated on three lapped pads located on the trunnion axis casing, they will define the proper plane of the primary mirror.

Spider 48 also carries a centrally disposed conical optical guide member 50 which opens into a monochromator 52 through a window 54. With this arrangement, incoming infrared radiation from the target is received by the parabolic primary mirror 44 and is reflected to the hyperbolic secondary mirror 46. The infrared radiation is then reflected by the Cassegrainian optical system into the monochromator 52.

The construction of the monochromator 52 is shown in FIGURES 4 and 5, and the arrangement of the optics is shown schematically in FIGURE 6. The monochromator contains two multiple-detector arrays 56 and 58, consisting of detector and field lens elements, cooling systems, a calibration system, a combined beam splitter and space filter, deflection mirrors, collimating mirrors, dispersion prisms, and collimating lenses.

As seen in FIGURE 5 the monochromator is mounted in a casting 60 fabricated from Meehanite or other suitable material which exhibits a low thermal coefficient of expansion, stability and ability to absorb vibration. The base of casting 60 is lapped flat so that no distortion occurs when it is attached to a support.

As seen in FIGURE 6, the entrance window 54 to the monochromator 52 preferably is fabricated from cadmium sulfide window and is 1 millimeter thick. It is located in the converging primary beam and attached to the casting 60. Cadmium sulfide is preferred because it is durable and non-hygroscopic; it transmits approximately 75 percent of the infrared energy out of 14 microns.

The Cassegrainian optical system focuses the infrared radiation onto a combined beam splitter and space filter 61 in the monochromator 52. The combined beam splitter and space filter comprises a disk 62 rotated by a drive motor 64, see FIGURES 14 and 15. Disk 62 is made of a highly transparent material, such as Kodak Irtran 1 and is provided with a plurality of radial reflecting bars on one surface thereof, formed by metallized strips, see FIGURE 14. The Irtran disk 62 transmits 85 percent of the energy falling on the spaces, and the bars or stripes reflect 92 percent of the energy irradiating them. The energy passing through the spaces is used for the 2 micron to 5 micron measurements, and the reflected energy is used for the 5 micron to 15 micron measurements.

In a preferred embodiment, the bars and spaces are each 0.040 inch wide (at the center of the field) and subtend 0.5 angular mil of the field of view. There are 90 bars on the disk 62 and it is caused to rotate at 1668 r.p.m. by drive motor 64, thus producing a chopping frequency of 2502 cycles per second. With this arrangement when infrared radiation from the telescope is projected on the disk 62, the rotation of the disk affects both the infrared radiation penetrating the disk and the infrared radiation reflected from the disk. When the image projected on the disk 62 is an infrared point source from an object viewed by the telescope, the rotation of disk 62 chops or modulates the radiation from the point source differently than it modulates the infrared background radiation. Consequently, the wave form of the infrared radiation from a point source either transmitted or reflected by the disk 62 will be different from the wave form of background infrared radiation. This difference provides a basis for a later discriminating between infrared radiation from a point source and from infrared background radiation. Consequently disk 62 has a combined function in that it serves as a beam splitter as well as a space filter.

As stated above, short infrared wavelengths are transmitted through the modulation disk 62 and the longer infrared wavelengths are reflected from the disk 62. The transmitted and the reflected beams are handled in separate optical systems, see FIGURE 6. The short wavelength optical system diverts the 2 to 5 micron energy, transmitted by the modulation disk 62 through an optical path to detector cell array 56. The energy is first deflected by an adjustable positioned plain mirror 70 having a reflectivity of 90 percent. From plain mirror 70, the energy is collimated by an off-axis adjustably mounted parabolic mirror 72 having a reflectivity of 98 percent. The collimated energy is then deflected by an adjustably mounted 98 percent reflective plain mirror 74 into the dispersion prisms 76, 78 and 80. The prisms are made from lithium fluoride and are used in a single path arrangement to provide ample beam dispersion. Lithium fluoride has a sharp decrease in transmittance above 5 microns so that these prisms also serve as filters. This strong, natural cutoff characteristic tends to keep all of the long wavelength radiation from reaching the detectors 56.

The dispersed energy from the prisms 76, 78, and 80 has to be re-imaged to present the spectrum. The imaging or relay lens 82 for this purpose preferably is a coated silicon singlet. In a preferred embodiment, lens 82 is equiconvex in shape and transmits 80 percent of the incident energy. Lens 82 is held by lens carrier 84, see FIGURE 5, which is mounted on casting 60. By using materials of high refractive index, such as silicon, it is possible to use a single lens to form an adequate image.

The short wavelength detector array 56 for the spectrometer preferably employs lead selenide photoelectric cells, cooled to liquid nitrogen temperature. Lead selenide detectors are essentially limited only by the background radiation in the field of view. Other detectors of comparable sensitivities to the 2 to 5 micron energy are made of lead telluride or indium stanate. These alternative detectors are somewhat less sensitive than lead selenide detectors. The lead telluride detectors usually have very high impedance (of the order of 100 megohms) and introduce problems with shielding and microphonics. Indium stanate detectors are extremely low impedance (of the order of 20 ohms) and therefore require transforming in the input of the amplifier to increase the level of their signal and the required transformer introduces problems in the radiation field.

Figure 10:
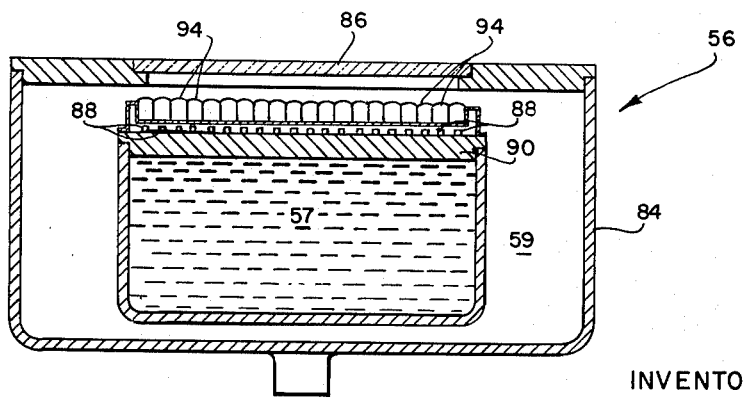
FIGURE 10 is a sectional view taken along the line 10—10 of FIGURE 7.

The detector array 56 is cooled by a liquid nitrogen filled container 57 and is housed in a Dewar container 84 which has a coated germanium window 86, see FIGURE 10. The use of germanium tends to prevent all radiation below 2 microns from entering the detector housing. Since different wavelengths fall on different portions of this window, anti-reflection coatings are applied in strips of varying thickness to optimize transmission throughout the region. Further details of this anti-reflection coating are shown and described in co-pending application Serial No. 119,193, filed June 23, 1961, now abandoned, entitled Anti-Reflection Coating and assigned to the same assignee as the present invention.

The energy transmitted through window 86 falls in the range between 2 and 5 microns, and is focused in spaced freqeuncy bands, on an array of 20 lead selenide detectors 88 mounted on a support 90 on the nitrogen cooled container 57 in the evacuated Dewar container 84. Each of the detectors 88 acts as an exit slit and receives energy from a portion of the spectrum approximately 0.15 micron in width. The output of the detectors is carried out of the Dewar through leads 92, see FIGURES 7 and 9.

The detector elements employed in the 2 to 5 micron region are 1 and ½ by 1 and ½ millimeters lead selenide cells each deposited on strontium titanate field lenses 94. With this arrangement the field lenses 94, see FIGURE 8, image the entrance aperture of the optical system on each detector to prevent infrared radiation from the object viewed from scanning the detector. Strontium titanate is required for satisfactory deposition of the detectors. Construction of the detectors is shown and described in greater detail in co-pending application Serial No. 172,587, filed February 12, 1962 entitled Coolable Multi-Element Infrared Detector Assembly, referred to above, assigned to the same assignee as the present invention.

Referring back to FIGURE 6, the 5 to 15 micron energy reflected by the bars on the disk 62 is dispersed by a long wavelength optical system similar to the optics used in the short wavelength path. Certain differences in the optical elements of the two paths exist. For example, prisms 96, 98 and 100 are made from sodium chloride instead of lithium fluoride as in the short wavelength optical system. The radiant energy reflected from the disc 62 impinges on flat mirror 102 and is redirected to flat mirror 104. From mirror 104, the beam is directed to parabolic mirror 106. The energy focused by mirror 106 is directed to flat mirror 108 which, in turn, directs the energy into the dispersing prisms and through relay lens 110 onto the detector array 58. As can be seen, mirrors 102–108 fold the long wavelength optical path in a manner compatible with the mechanical structure of the spectrometer apparatus. The relay lens 110 is coated germanium (80 percent transmission) instead of silicon as in the short wavelength optics, because of its low dispersion and a high refractive index in the 5 to 15 micron region. This permits a single lens design to provide a satisfactory image.

Three prisms are used in both the short and the long wavelength dispersion systems to increase the dispersion, thus reducing the power of the imaging lenses required to cover the 60 millimeter image field. Magnification of the spectrum is minimized and, therefore, spectrum shift caused by tracking fluctuations is minimized. In a practical construction of the invention, a maximum angular error of one-half milliradian in the line of sight causes the spectrum to shift by less than 0.05 micron in the short wavelength region and by approximately 0.15 micron in long wavelength region.

The long wavelength energy is focused on an array of infrared responsive detectors 58, mounted in a liquid-neon cooled Dewar. The detectors in array 58 may be of the gold-doped germanium-silicon alloy type. Here again, each detector in the array acts as an exit slit and receives energy from a portion of the spectrum approximately 0.5 micron in width. The detector field lenses are coated germanium (95 percent transmission) instead of strontium titanate as used in the short wavelength array since the 5 to 15 micron detectors are not deposited onto the field lenses. The detector cell array 58 utilized for long wavelengths is structurally similar to the short wavelength array 56, with the exception of the above-noted difference in cell material. Also, the long wavelength detectors are not deposited onto the field lenses as in the case of the short wavelength detectors.

FIGURES 7–10 illustrate the general mounting arrangement and other physical features of both the cell arrays. Each array comprises twenty individual cells arranged in a row. The 40 detectors in each of the two arrays 56 and 58 are each 1.5 by 1.5 millimeters in size. All of these detectors are irradiated by the same field of view which is approximately 2 milliradians in diameter. A more complete discussion and disclosure of these detectors is provided in co-pending application Serial No. 172,587, filed February 12, 1962 referred to hereinabove.

As has been indicated hereinbefore, the lead selenide cells of the short wavelength detector array require cooling to liquid nitrogen temperatures and the gold-doped gemanium-silicon detectors must be cooled to liquid neon temperatures.

At the present state-of-the-art, there are three methods suitable for achieving these temperatures. The first involves the use of the Joule-Thompson effect. A gas may be stored in highly compressed gaseous or liquid form for use. Upon demand, a supply of this gas under high pressure is made available to a Joule-Thompson cell cooler. This type of cooling has been widely used in structures of the prior art. However, extreme precaution must be observed with regard to contamination of the gas, and either a closed-loop cooling system or a liquid supply is generally required for maximum reliability. Moreover, as the areas to be cooled increase, greater and greater difficulty is experienced in maintaining the uniform temperatures.

The second method involves the use of small expansion engines which permit incoming compressed gas to do external work under approximately adiabatic conditions, thus cooling the gas. This is also used in conjunction with Joule-Thompson coolers in some applications.

The third method uses cryogenic liquid directly. In the simplest possible approach, the infrared detector is mounted directly to the Dewar flask and the cooling is provided by the heat of vaporization of the liquid which is allowed to boil under a controlled pressure. Such a straightforward approach, although an open system which therefore allows the gas to be lost, has much to recommend if from the standpoint of reliability.

The latter cooling system is preferred in the present embodiment of the invention. In this embodiment, liquid nitrogen is used for the lead selenide Dewar. This liquid is safe and generally available in quantities at a reasonable cost.

Two liquids are available for use in cooling the gold-doped germanium-silicon detectors namely, liquid neon at 27.2 degrees Kelvin (atmospheric pressure) and liquid hydrogen at 20.3 degrees Kelvin (atmospheric pressure). The spectrometer design of the present invention is compatable with the use of liquid hydrogen. The only difference being the time of operation before refill and a change in the absolute pressure setting of the relief valve. Since the heat of vaporization of liquid hydrogen is only about ⅓ that of liquid neon on an equal volume basis, and is a function of the pressure required in the cooling system to maintain the proper detector temperature, the time between refills is altered.

The Dewars are designed to be capable of cooling the detectors, mounted as shown in FIGURES 10, to the proper operating temperatures for 8½ hours. The Dewars are insulated and the space 59 between the liquid is filled container and the walls of the Dewar evacuated to 0.1 micron pressure or less.

The inner liquid container chambers 57 are designed to withstand the pressure generated by the evaporating liquid which is used to control the boiling point. The pressure level in the chamber 57 is maintained by a suitable differential pressure relief valve which vents into an absolute pressure relief valve in a manner well-known in the art. This absolute pressure valve maintains the proper reference pressure level regardless of the pressure of the external environment. The Dewars are coupled to the relief valves by suitable vent lines.

The function of the spectrometer electronic system is to convert and amplify the signals developed by the individual detector cells into a form which is suitable for recording purposes and for immediate display. This system is shown in FIGURE 11.

The signals from the forty infrared detectors comprising arrays 56 and 58 are processed so as to be acceptable to standard recorders of any suitable and well-known construction. The system consists of a matching preamplifier 116, followed by a variable attenuator 117, and a series of linear amplifiers and bandpass filters terminating in a diode detector 118 for each of the forty detectors. The preamplifiers 116 are preferably mounted in close proximity to the detector arrays. These preamplifiers serve to match the impedance of the detector cells to the amplifier cables, and at the same time, provide some signal amplification.

The ouput of the individual detector cell in the presence of radiation is an A.C. signal at the chopping frequency with an amplitude proportional to the target radiance. The power level of this signal is extremely small, but the dynamic range between signals which can be barely discriminated from the inherent noise and the energy level at which saturation or other significant non-linearity occurs, is extremely large, about 100 decibels in signal voltage level. However, most appropriate data recording devices require moderate power levels. Also, typical recording media and devices for human observation have quite limited dynamic ranges, usually not over 40 decibels, with measurement precision suffering considerable losses at the lower end of the range. In addition, the data handling devices selected require D.C. signal inputs.

Attenuators 117 each have attenuation steps of 0, 20 decibels, 40 decibels, and 60 decibels. These are controlled manually by the operator in sets of ten attenuators at one time. There are four sets corresponding to four separate bands in which the spectrum is divided. The operator determines the appropriate settings by observation of a monitoring oscilloscope and calibrator as will be described hereinafter.

After attenuation, the signal from each detector cell is subject to additional linear amplification, passed through a narrow band-pass filter incorporated into the amplifier, and then detected to convert the signal to a D.C. level suitable for recording and/or other operations that may be required. Any suitable and well-known linear amplifier may be used. The filter section of the linear amplifier 118 is a very narrow band-pass filter with a center frequency of 2500 cycles which increases the signal-to-noise ratio of the signal. The output of the filter section is coupled to a diode demodulation circuit. Any suitable and well-known demodulator may be employed, and may for example consist of two germanium diodes in a voltage doubler configuration. The output from the electronic systems are instantly recorded and presented on a monitoring oscilloscope for observation by the operator.

The energy range received by the detectors is in the order or $10^6$ to 1, while the data handling equipment has a dynamic range capability of approximately 100 to 1. In order to match the dynamic range of these input signals to the dynamic range of the recording equipment, attenuators 117, described hereinabove, are used in each of the forty channels.

The problem of handling spectrographic data has received the attention of many investigators. The types of signal processing systems have been considered for the multiple-detector spectrometer. One type involves the use of multiple detectors and scanning their output with an electronic sampling switch. This procedure permits the output of all cells to be recorded on one magnetic tape channel. Also, this system is useful in connection with the oscilloscope display which will be described more completely hereinafter.

A second procedure which will achieve the ultimate in detection of high-frequency target energy fluctuations involve the use of multiple-detectors with separate pre-amplifiers, filters, and recorder amplifiers for each channel. This system eliminates the electronic switch, but complicates the system by adding more amplifiers and requiring more elaborate recording equipment.

The display presented to the operator on the face of the oscillograph tube 120 will represent the entire infrared spectrum in the form of forty vertical bars 122 whose displacement from one side of the tube face is proportional to wavelength and whose height above some horizontal reference line is proportional to the energy incident on the corresponding infrared detector cell, see FIGURE 1.

To generate the signals for the oscilloscope, a sampling switch and sweep generator are provided in a manner well-known to the art. The rotatable arm (not shown) of the sampling switch sequentially scans the circularly mounted leads 92 of the detector cells at a rate of 900 steps per second thereby sampling the entire spectrum 20 times per second, see FIGURE 7. The commutator inputs are connected to the D.C. outputs of the forty detector channels in order of increasing wavelengths. The commutated voltage is fed to the oscilloscope vertical deflection amplifier. The sweep generator will position the cathode ray beam in the horizontal direction. The attenuators 117 are adjusted to the minimum degree of attenuation at which none of the spectral bands reach a predetermined saturation level indicated near the top of the oscilloscope tube. Inasmuch as it is anticipated that for most objects the spectrum will be a relatively smooth curve and because it would be extremely difficult for the operator to control forty individual attenuators manually, the attenuators are combined into four groups of ten adjacent channels. In the event that strong emission or absorption bands are observed, the operator might periodically switch the set of attenuators involved between the two appropriate settings to prevent data from the adjacent wavelength being lost by depression or saturation. The individual attenuators can be adjusted, as stated previously, to compensate for known absorption bands for a particular run. The interconnection between the sub-systems of the spectrometer are shown in FIGURE 12.

As will be appreciated by those versed in the art, the output may be applied to an automatic data reduction system rather than to an oscillograph recorder, thus overcoming laborious data reduction.

A black body calibration source may be located on on the monochrometer, as well as described below, so that the complete system can be easily calibrated before each measurement.

There is shown in FIGURE 13 a calibrater 124 for internally calibrating the spectrometer using a 600° centigrade black body source 126. A multiple aperture plate 128 interposed between baffles 130 and 132 controls the emission from the black body 126 into the monochrometer. Plate 128 carries ten apertures of different area which are used to provide a 200 to 1 range in calibration energy. This allows the spectrometer channels to be calibrated at different energy levels and, in addition, gives an indication that all detectors and amplifiers are properly functioning. Since the calibration system is built into the spectrometer, it is possible to calibrate any time simply by operating the calibration switch on the control console.

The energy passing through one of the apertures in plate 128 from source 126 is formed into a beam by two germanium lenses 134 and 136. A fixed flat mirror 138 is interposed between lenses 134 and 136 to fold the optical path. Lenses 134, 136 and mirror 138 may be supported by any convenient and suitable tubular housing 140. The black body standard beam is reflected into the monochrometer by pivotal mirror 141 and from then on follows the same path as the beam from the external optical system.

Aperture plate 128 is rotatably carried on shaft 142 and may be angularly indexed, via gears 144 and 146 by means of stepping motor 148. This will permit the appropriate calibration aperture for the energy desired to be selected from a remote control switch. As stated above, the energy then follows the same path in arriving at the detectors as that of the energy from the distant source. That is, the beam from the calibration source passes through disc 62 and focusses at the same point as the external beam. The only factors not entering the calibration are changes in the reflective losses of the primary and secondary mirrors in the external optical system. Since the spectrum of the black body is known, the display on oscilloscope 120 can be compared with the known spectrum.

To provide a basis for adjusting the spectrometer there has been described hereinabove a spectrometer system capable of measuring infrared energy emitted by targets and backgrounds of military interest over a wide wavelength region.

Because of its wide spectral coverage, the novel spectrometer apparatus of the present invention is capable of measuring targets possessing great variety of temperature and spectral distributions. As will be apparent to those skilled in the art, various modifications and additions to the basic invention may be made. For example, the spectrometer unit may be provided with either a servo drive system or means by which tracking of targets may be manually accomplished. Also, the spectrometer system may be provided with a seeker-head, tracking, and stabilization apparatus to automatically perform these functions. Such auxiliary apparatus may include optical, infrared, or radar devices.

In the preferred embodiment described, the spectrometer has two data outputs; one to be fed to the monitor oscilloscopes, the other to be fed to a recording oscillograph. With this approach, it is necessary to read manually and then to interpret the data. However, provisions may be made for recording the spectrometer data in a pulse duration code on magnetic tape for used in automatic computer data reduction.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention; therefore, it is intended that the invention be limited only as indicated by the scope of the following claims.

We claim:

1. An infrared spectrometer comprising: collecting optics for receiving radiation from an emissive target and focusing said rays into a beam, monochromator means responsive to said beams for dispersing the infrared energy in said beam into a spectrum, said monochromator means comprising first and second monochromators, said first monochromator being responsive to long wave lengths and said second monochromator being responsive to short wave lengths for dispersing said beam into a pair of spectra, a multiple channel detector for each spectrum having a plurality of infrared responsive cells, each of said cells being disposed to receive light of a corresponding wavelength in said spectrum.

2. An infrared spectrometer as defined in claim 1 having means for directing said spectrometer at an emissive target.

3. An infrared spectrometer as defined in claim 2 wherein said directing means comprises a housing rotatably mounted about an azimuth axis and a drum carrying said housing and rotatable about an elevation axis.

4. An infrared spectrometer as defined in claim 1 having modulator means for cyclically interrupting the energy in said beam thereby converting said energy into a pulse train signal.

5. An infrared spectrometer as defined in claim 4 wherein said modulator means comprises a disc having a plurality of radially disposed transparent sections between which are interposed a plurality of radially disposed reflecting sections.

6. In a spectrometer, optical means for directing radiant energy from a remote source into a beam, first and second monochromators responsive to said beam for dispersing the energy in said beam into a pair of spectra, said first monochromator being responsive to long wave lengths and said second monochromator being responsive to short wave lengths, modulator means interposed between said optics and said first and second monochromators means for cyclically interrupting said beam, a plurality of infrared responsive cells disposed along the path of said spectra for receiving energy at a plurality of wavelengths, each of which corresponds to one of said plurality of cells, and indicator means responsive to the output of said cells for displaying the spectrum of the energy from said source.

7. Apparatus as defined in claim 6 having calibration means for establishing a radiant energy signal of known characteristics for calibrating said spectrometer.

8. Apparatus as defined in claim 7 wherein said calibration means includes a black body source and a chopping disc interposed between said black body and said spectrometer for cyclically interrupting the energy from said black body.

9. Apparatus as defined in claim 6 having scanning means for sequentially sampling the output from said plurality of cells thereby presenting a time sequence signal to said indicator means.

10. Apparatus as defined in claim 6 wherein said indicator means comprises a cathode ray oscilloscope and said sequential signals are displayed along one axis of said oscilloscope and the amplitude of said signals are displayed along the alternate axis of said oscilloscope.

11. An infrared spectrometer comprising in combination a telescope, a space filter and a monochromator, said space filter being arranged so that radiation from a point source is modulated differently than background radiation so that the effect of background radiation on the spectrometer can be eliminated, dispersing means in said monochromator for separating the infrared spectrum in such a way that the frequency bands in the spectrum are in spaced relation to each other, said telescope positioned to direct infrared energy in its field of view into the monochromator and through said dispersing means whereby the infrared spectrum from the object viewed by the telescope is separated into a plurality of frequency bands in spaced relation to each other, a plurality of infrared detectors mounted in said monochromator, each detector positioned so one of the frequency bands from the spectrum from the object viewed by said telescope falls thereon whereby the detector outputs provide a signal proportional to the energy distribution in the infrared spectrum from the object viewed by the telescope.

12. The spectrometer described in claim 11 including a seeker head and an adjustable support for said spectrometer so that the spectrometer can automatically follow an object viewed by the telescope.

13. An infrared spectrometer comprising in combination a telescope and a monochromator, first and second dispersing means in said monochromator, each dispersing means separating a portion of the infrared spectrum into infrared frequency bands in spaced relation to each other, a beam splitter mounted in said monochromator, said telescope positioned to focus infrared radiation from an object in its field of view onto said beam splitter whereby the infrared spectrum from the object viewed by the telescope is split into two parts, first means in said monochromator for directing one part of said infrared spectrum into said first dispersing means, second means, said monochromator directing the other part of said infrared spectrum into a second dispersing means, a first detector array mounted in said monochromator and associated with said first dispersing means so that each of the frequency bands from said first dispersing means falls on the detectors in said first detector array, a second detector array mounted in said monochromator and associated with said second dispersing means so that each of the frequency bands from said second dispersing means falls on one of the detectors in said second detector array whereby the detector outputs provide a signal proportional to the energy distributed to the infrared spectrum from the object viewed by the telescope.

14. The spectrometer described in claim 13 wherein said beam splitter separates the infrared spectrum into two parts, the wavelengths of one of said parts being 2–5 microns and the wavelengths of the other part being 5–15 microns, said first dispersing means associated with the 2–15 microns of the infrared spectrum and comprising at least one lithium fluoride prism, said second dispersing means associated with the 5–15 microns part of the spectrum and comprising at least one sodium chloride prism.

15. The spectrometer described in claim 14 wherein at least one of said prisms serves as a filter to prevent radiation beyond a predetermined limit from reaching an associated detector array.

16. An infrared spectrometer comprising in combination a telescope and a monochromator, first and second dispersing means in said monochromator, each dispersing means separating a portion of the infrared spectrum into frequency bands in spaced relation to each other, a combined beam splitter and space filter mounted in said monochromator, said telescope positioned to focus infrared radiation from an object in its field of view and from background radiation onto said beam splitter whereby the infrared spectrum from the object viewed is split into two parts and the resultant signal from the radiation from the object viewed differs from the signal due to background radiation, first means in said monochromator for directing one part of said infrared spectrum into said first dispersing means, second means in said monochromator for directing the other part of said infrared spectrum into said second dispersing means, a first detector array mounted on said monochromator and associated with said first dispersing means so that each of the frequency bands from said first dispersing means falls on one of the detectors in said first detector array, a second detector array mounted in said monochromator and associated with said second dispersing means so that each of the frequency bands from said second dispersing means falls on one of the detectors in said second detector array whereby the detector outputs provide a signal proportional to the energy distribution in the infrared spectrum from the object viewed by the telescope and from background infrared radiation.

17. The spectrometer described in claim 16 including an electronic display for instantaneously displaying the spectrum of an object viewed by the telescope, and filter means connected between said display and said monochromator for filtering the signal from said monochromator due to the background radiation on the basis of the difference between the way the combined beam splitter and space filter modulates the radiation from a point source object and the background radiation.

References Cited by the Examiner

UNITED STATES PATENTS

| | | | |
|---|---|---|---|
| 2,824,972 | 2/58 | Beitz | 250—83.3 |
| 2,958,802 | 11/60 | Hammar et al. | 250—83.3 X |
| 2,995,973 | 8/61 | Barnes et al. | 250—83.3 X |
| 3,038,996 | 6/62 | Grube | 250—83.3 |
| 3,064,924 | 11/62 | Fairbanks | 250—83.3 X |
| 3,093,736 | 6/63 | McLaughlin et al. | 250—83.3 |
| 3,100,264 | 8/63 | Jaffe et al. | 250—226 X |

RALPH G. NILSON, *Primary Examiner.*

ARCHIE R. BORCHELT, *Examiner.*